US008813217B2

(12) United States Patent
Guan et al.

(10) Patent No.: US 8,813,217 B2
(45) Date of Patent: Aug. 19, 2014

(54) METHOD AND SYSTEM FOR AUTHORIZING AND CHARGING HOST WITH MULTIPLE ADDRESSES IN IPV6 NETWORK

(75) Inventors: Hongguang Guan, Shenzhen (CN); Jin Wang, Shenzhen (CN); Yongqiang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1202 days.

(21) Appl. No.: 11/677,915

(22) Filed: Feb. 22, 2007

(65) Prior Publication Data
US 2007/0169180 A1 Jul. 19, 2007

Related U.S. Application Data

(63) Continuation of application No. PCT/CN2005/001232, filed on Aug. 10, 2005.

(30) Foreign Application Priority Data

Sep. 1, 2004 (CN) .......................... 2004 1 0055381

(51) Int. Cl.
*H04L 29/06* (2006.01)
*H04L 12/14* (2006.01)
*H04L 29/12* (2006.01)

(52) U.S. Cl.
CPC ............... *H04L 12/14* (2013.01); *H04L 69/167* (2013.01); *H04L 12/1485* (2013.01); *H04L 29/12009* (2013.01); *H04L 29/12783* (2013.01); *H04L 61/35* (2013.01); *H04L 63/0892* (2013.01); *H04L 63/101* (2013.01)
USPC ................................................. 726/14; 726/4

(58) Field of Classification Search
CPC ...... H04W 12/06; H04L 63/08; H04L 69/167
USPC ................................................. 726/2–4, 14
See application file for complete search history.

(56) References Cited

U.S. PATENT DOCUMENTS

| 6,427,170 B1 | 7/2002 | Sitaraman et al. |
| 2002/0188562 A1* | 12/2002 | Igarashi et al. ................ 705/40 |

(Continued)

FOREIGN PATENT DOCUMENTS

| CN | 1423452 A | 6/2003 |
| CN | 1464715 A | 12/2003 |

(Continued)

OTHER PUBLICATIONS

Aboba et al., "Radius and IPv6," IETF Standard, Internet Engineer Taks Force (Aug. 2001).

(Continued)

*Primary Examiner* — Joseph P. Hirl
*Assistant Examiner* — John B King
(74) *Attorney, Agent, or Firm* — Leydig, Voit & Mayer, Ltd.

(57) ABSTRACT

A method for authorizing and accounting a host with multiple addresses in IPv6 Network includes: authorizing multiple addresses of the host respectively; charging the multiple addresses authorized of the host respectively. A system based on the above method includes: a network access server, for transmitting accounting information of multiple addresses of a host upon receiving authorization information; an Authentication, Authorization and Accounting (AAA) server, for authorizing the multiple addresses of the host respectively, and transmitting the authorization information to the network access server; receiving the accounting information transmitted from the network access server, and charging the multiple addresses according to the accounting information respectively. Consequently, it may be implemented to authorize different multiple addresses of the host and charge the different multiple addresses according to different charging rates respectively in an IPv6 network in accordance with embodiments of the present invention.

19 Claims, 1 Drawing Sheet

(56) References Cited

U.S. PATENT DOCUMENTS

2002/0199104 A1* 12/2002 Kakemizu et al. ............ 713/168
2004/0064741 A1 4/2004 Haverinen et al.

FOREIGN PATENT DOCUMENTS

| WO | 01/13289 A2 | 2/2001 |
| WO | 2004/002108 A1 | 12/2003 |
| WO | 2004/064442 A1 | 7/2004 |

OTHER PUBLICATIONS

Lind et al., "Scenarios and Analysis for Introducing IPv6 into ISP Networks," IETF Standard, Internet Engineering Task Force (Dec. 2003).

Rigney, "Radius Accounting" (Jun. 2000) www.ietf.org/rfc/rfc2866.txt [retrieved on Jun. 28, 2002].

Rigney et al., "Remote Authentication Dial in User Service (RADIUS)," IETF Standard, Internet Engineering Task Force (Jun. 2000).

"Telecommunications Security," ETSI Standards, European Telecommunications Standards Institute, LI:V111 (Feb. 2004).

Notice of Opposition in corresponding European Application No. 05772879.2 (Dec. 6, 2010).

"White Paper—IPv6 Access Services," Dec. 19, 2002, Cisco, San Jose, California.

Hinden et al., "RFC 3513—Internet Protocol Version 6 (IPv6) Addressing Architecture," Apr. 2003, Network Working Group, The Internet Society, Reston, Virginia.

Written Opinion of the International Searching Authority in corresponding PCT Application No. PCT/CN2005/001232 (Nov. 10, 2005).

International Search Report in corresponding PCT Application No. PCT/CN2005/001232 (Nov. 10, 2005).

$1^{st}$ Office Action in corresponding European Application No. 05772879.2 (Apr. 8, 2008).

Communication in corresponding European Application No. 05772879.2 (Jan. 26, 2012).

Decision Rejecting the Opposition in corresponding European Patent Application No. 05772879.2 (Jan. 3, 2013).

Response to Notice of Opposition in corresponding European Application No. 05772879.2 (Jul. 7, 2011).

Deering et al. "Internet Protocol, Version 6 (IPv6) Specification," Dec. 1998, RFC2460, The Internet Society, Reston, Virginia.

* cited by examiner

METHOD AND SYSTEM FOR AUTHORIZING AND CHARGING HOST WITH MULTIPLE ADDRESSES IN IPV6 NETWORK

This application is a continuation of International Patent Application No. PCT/CN2005/001232, filed Aug. 10, 2005, which claims priority to Chinese Patent Application No. 200410055381.X, filed Sep. 1, 2004, all of which are hereby incorporated by reference.

FIELD OF THE INVENTION

The present invention relates to network communication technologies, and particularly, to a method and system for authorizing and charging a host with multiple addresses in an IPv6 network.

BACKGROUND OF THE INVENTION

During the operation of a network, implementing Authentication, Authorization and Accounting (AAA) of a host accessing the network is an important part of user management. On the one hand, a network operator needs to authorize different hosts accessing the network to allow them to access corresponding services, and then charges different hosts for different services. On the other hand, the charging rates for the same host for the same service at different time may be different. In order to implement the above charging, the network operator is required to be able to acquire the various accounting data of the hosts accessing the network.

Since in the operable and manageable network, the authorization and charging of the host directly influences operator's income and user's benefit, a reasonable accounting policy is necessary for the operator, without which both the operator's and user's benefit can not be guaranteed.

In the IPv4 network, Internet Engineering Task Force (IETF) has defined related RADIUS (Remote Authentication Dial in User Service) protocols such as RFC2865, RFC 2866 (RFC, Request for Comments) and the like to ensure a unified charging of the host. Although in an IPv6 network, IETF defines RFC2865, RFC2866 and RFC3162 to describe the procedure of authenticating and charging the IPv6 and IPv4 hosts, the authentication and accounting techniques based on users also develop constantly along with the continuous development of the IPv6 network.

In the IPv6 network, one or multiple unicast addresses (a unicast address is used for unicast transmission, and during the unicast transmission, data transmission path from a source host to each destination host are established independently) may be allocated for a host. Considering practical requirements of the network operator, it is needed to provide different authorizations to different addresses allocated for the host and adopt different accounting policies in an RDIUS server, a DHCP (Dynamic Host Configuration Protocol) server or other servers. For instance, when a host accesses different services by different IP addresses of the host, the host may be charged for the different services according to different charging rates.

However, at present, there is not a method for respectively authorizing and respectively charging different IP addresses of the same host, even in RFC3162.

SUMMARY OF THE INVENTION

Embodiments of the present invention provide a method and a system for authorizing and charging a host with multiple IP addresses in an IPv6 network, so as to implement respective authorization according to different IP addresses of the host, and implement respective charging by adopting different accounting policies.

An embodiment of the method for authorizing and charging a host with multiple addresses in an IPv6 Network includes:

authorizing the multiple addresses of the host respectively;

charging the authorized multiple addresses of the host respectively.

The process of authorizing the multiple addresses of the host includes:

authorizing, by an Authentication, Authorization and Accounting (AAA) server, the multiple addresses of the host respectively, and transmitting authorization information of the authorized multiple addresses of the host;

the process of charging the authorized multiple addresses of the host respectively includes:

transmitting, by a network access server, accounting information corresponding to the authorized multiple addresses of the host to the AAA server;

charging, by the AAA server, the authorized multiple addresses of the host respectively according to the accounting information.

The accounting information of the authorized multiple addresses includes at least one of:

an identifier of a session, transmitted by each address of the authorized multiple addresses; and flow, transmitted by each address of the authorized multiple addresses.

The flow transmitted by each address of the authorized multiple addresses includes at least one of: input flow and output flow transmitted by each address of the authorized multiple addresses.

The flow is transmitted by each address of the authorized multiple addresses in octet or in packet.

The AAA server includes: a Remote Authorization Dial in User Service (RADIUS) server.

The RADIUS server transmits the authorization information contained in an Access-Accept packet to the network access server; and the network access server transmits the accounting information contained in an Account-Request packet to the RADIUS.

The RADIUS server transmits the authorization information contained in an extensible field of the Access-Accept packet to the network access server; and the network access server transmits the accounting information contained in an extensible field of the Account-Request packet to the RADIUS.

The extensible field includes: a Vendor-Specific field defined in RFC2865 protocol.

The authorization information and accounting information respectively includes the following attributes: Type, Length, Attr-Count and String.

The String includes: Type, Length and Value.

The Value includes one of: Framed-IP-Address, Framed-IPv6-Prefix and Login-IPv6-Host.

The Value of the authorization information further includes at least one of: Class, State, Session-Timeout, Termination-Action and Framed-Routing.

The Value of accounting information further includes at least one of: Acct-Session-Id, Acct-Input-Octets, Acct-Output-Octets, Acct-Input-Packets and Acct-Output-Packets.

A system for authorizing and charging a host with multiple addresses in an IPv6 network includes:

a network access server, for transmitting accounting information of the multiple addresses of the host upon receiving authorization information;

an Authentication, Authorization and Accounting (AAA) server, for authorizing the multiple addresses of the host respectively, and transmitting the authorization information to the network access server; receiving the accounting information transmitted from the network access server, and charging the multiple addresses according to the accounting information respectively.

An Authentication, Authorization and Accounting (AAA) server includes:

a first unit, for authorizing multiple addresses of a host respectively, and transmitting authorization information to a network access server;

a second unit, for receiving accounting information transmitted from the network access server, and charging the multiple addresses according to the accounting information respectively.

A network access server includes:

a unit, for transmitting accounting information of multiple addresses of a host upon receiving authorization information.

It can be seen from the above technical scheme that, in accordance with the embodiments of the present invention, the authorization information aid accounting information of different host addresses may be transmitted by extending the Access-Accept packet sent to the network access server and the Account-Request packet sent to the RADIUS server during an RADIUS procedure, so as to enable devices such as the RADIUS server and the network access server to acquire corresponding authorization information and accounting information of each IP address of the host. Consequently, in an IPv6 network, different IP addresses of the host may be authorized respectively and the different IP addresses of the host may be charged respectively by adopting different accounting policies in accordance with the embodiments of the present invention.

DETAILED DESCRIPTION OF THE INVENTION

According to the method in accordance with embodiments of the present invention, during a RADIUS procedure for a host, a RADIUS server respectively authorizes different IP addresses of the host and transmits authorization information to a network access server, such as a Broadband Remote Access Server (BRAS) and so on. Meanwhile, the network access server sends accounting information of the different IP addresses of the host to the RADIUS server for charging, thereby the different IP addresses of the host is authorized and charged respectively in an IPv6 network.

Figure 1:
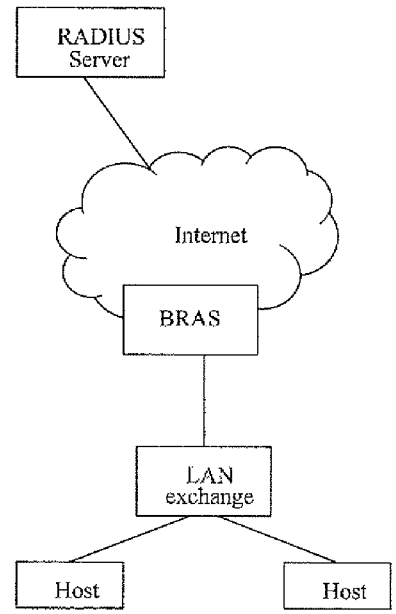
FIG. 1 is a schematic diagram illustrating the network environment where an embodiment of the present invention is applied.

As shown in FIG. 1, a broadband subscriber (namely a host) accesses the Internet through a Local Area Network (LAN) exchange and a BRAS on the edge of the Internet, that is, a network access server. In an operable and manageable network, the broadband subscriber needs to implement corresponding identity authentication before getting online. The authentication of the broadband subscriber is implemented via Point to Point protocol (PPP), 802.1x, WEB authentication or other authentication method, for example, a broadband subscriber inputs the username and password, and the BRAS sends the username and password to an RADIUS server for authentication upon obtaining the username and password.

The RADIUS server specially works on the following procedure: after a host accesses a network access server (such as a BRAS and the like), the network access server submits user information including a username, password and so on to the RADIUS server through an Access-Request packet; the RADIUS server verifies the validity of the username and password; if the username and password are valid, the RADIUS server will return an Access-Accept packet indicating that the access is allowed to the network access server, thereby allowing the host to implement subsequent procedure, otherwise the RADIUS server will return an Access-Reject packet to the network access server to reject the host's access; if the access is allowed, the network access server sends an Account-Request packet to the RADIUS server, and the RADIUS server answers an Account-Response packet to the network access server and initiates the procedure of charging the host.

Figure 2:
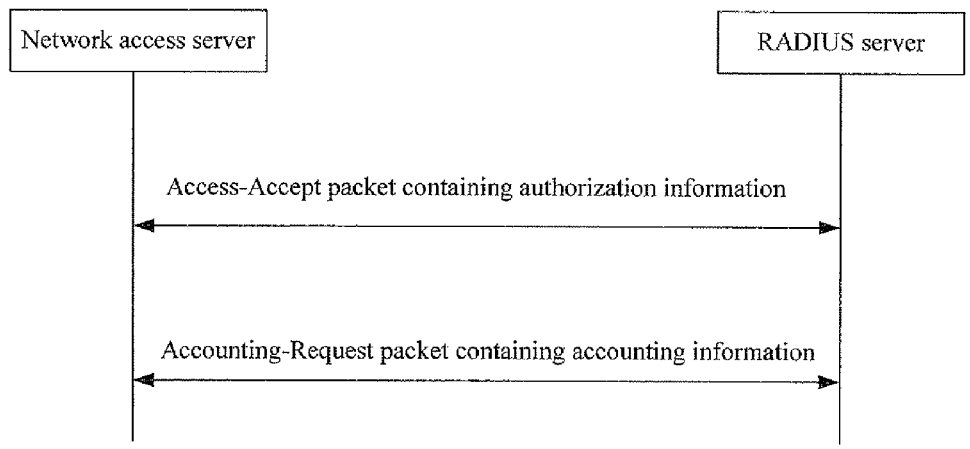
FIG. 2 is a flow chart illustrating the method in accordance with the embodiment of the present invention.

In accordance with an embodiment of the present invention, an RADIUS server sends authorization information of different IP addresses of the host to a BRAS through a corresponding Access-Accept packet, which is as shown in FIG. 2. Moreover, the RADIUS server instructs the BRAS to authorize the host. In order to ensure that the RADIUS server may transmit authorization information of different IP addresses to the BRAS through the Access-Accept packet, the Access-Accept packet based on RFC2865 protocol is extended with Auth-Address-Author attribute added in accordance with the embodiment of the present invention.

The specific format of the Auth-Address-Author attribute is as shown in Table 1.

TABLE 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |   Attr-Count  |    String ...
+-+-+-+-+-+-+-+-+-+-+-+-+-+-+-+-+-+-+-+-+-+-+-+-+-+-+-+-+-+-+-+-+
```

Type (type): the value of which may be set as 65, and the value may be adjusted according to practical conditions, as long as the value does not conflict with the values of the Type of existing attributes.

Length (length): total length of TLV of the attribute, wherein the TLV refers to Type, Length, and Value, and the Value is the sum of Attr-Count and String.

Attr-Count (sub-attribute count): number of sub-attributes.

String (sub-attribute contents): contents of a sub-attribute.

The Auth-Address-Author attribute contained in the Access-Accept packet may appear one time or multiple times, and the Auth-Address-Author attribute may also not appear.

The whole structure of the sub-attribute (String) contained in the Auth-Address-Author attribute is as shown in Table 2.

TABLE 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |     Value ...
+-+-+-+-+-+-+-+-+-+-+-+-+-+-+-+-+-+-+-+-+-+-+-+-+-+-+-+-+-+-+-+-+
```

The sub-attribute may use the attribute defined in RFC 2865 and RFC 3162, without any change of the TLV (Type, Length, and Value) of the attribute. The Value of the sub-attribute needs to use one of the following attributes to indicate a designated IP address:

Framed-IP-Address: indicating the address to be configured for the host;

Framed-IPv6-Prefix: indicating an IPv6 prefix (and corresponding route) to be configured for the host;

Login-IPv6-Host: indicating a system with which to connect the host.

The Value of the sub-attribute also may be extended and used for implementing related authorization according to needs, for example, Access Control List (ACL), Committed Access Rate (CAR) and so on. The attributes which may be used when the related authorization is implemented include:

Class: class;

State: state;

Session-Timeout: setting the maximum number of seconds of service to be provided to the host before termination of a session;

Termination-Action: indicating what action a network access server should take when the specified service is completed;

Framed-Routing; indicating the routing method for the host when the host is a router to a network.

The method of encapsulating the sub-attribute in the Auth-Address-Author attribute is the same as that in a Vendor-Specific defined in RFC2865.

Meanwhile, the Access-Accept packet with an extensible field between a network access server and an Authentication, Authorization and Accounting (AAA) server may also be the packet including a Vendor-Specific (it is an attribute that may be designated on demand) field and transmitted between the network access server and the AAA server. The contents of the sub-attribute in the Auth-Address-Author attribute may be encapsulated in the Vendor-Specific defined in RFC2865 protocol, thereby avoiding extending the Auth-Address-Author attribute in the Access-Accept packet, but the value of the Type of the sub-attribute needs to be adjusted to avoid confliction.

In accordance with the embodiment of the present invention, for the processing procedure based on RADIUS protocol, it is needed to supplement the RADIUS protocol by adding an Acct-Address-flow attribute to the packet transmitted by the network access server to the RADIUS server, so as to ensure that accounting information such as flow of different IP addresses of the host may be transmitted to the RDIUS server and ensure that the RADIUS server may identify the accounting information corresponding to different IP addresses. In accordance with the embodiment of the present invention, the Acct-Address-Flow attribute is transmitted to the RADIUS server by containing the Acct-Address-Flow attribute in an Account-Request packet during the processing procedure based on RADIUS protocol which is as shown in FIG. 2.

The specific format of the Acct-Address-Flow attribute is the same as the format of the Auth-Address-Author attribute. The difference only lies in the different content information contained in specific fields. The format of the Acct-Address-Flow attribute is as shown in Table 3.

TABLE 3

| 0 | 1 | 2 | 3 |
|---|---|---|---|
| 0 1 2 3 4 5 6 7 | 8 9 0 1 2 3 4 5 | 6 7 8 9 0 1 2 3 | 4 5 6 7 8 9 0 1 |
| Type | Length | Attr-Count | String... |

Type (type): value of which may be set as 64, and the value may be adjusted according to practical conditions, as long as it is not conflicted with the values of the Type of existing attributes.

Length (length): total length of TLV (Type, Length and Value) of the attribute, wherein the Value is the sum of the Attr-Count and String.

Attr-Count (sub-attribute count): number of sub-attributes.

String (sub-attribute contents): contents of a sub-attribute.

The Acct-Address-Flow attribute is a new-added attribute and may appear one time or multiple times, or not appear.

The attribute contains the following sub-attribute (String). The whole structure of the sub-attribute is the same as that of the sub-attribute of the Auth-Address-Author attribute. The difference only lies in the specific contents contained in each field. The whole structure of the sub-attribute is as shown in Table 4.

TABLE 4

| 0 | 1 | 2 | 3 |
|---|---|---|---|
| 0 1 2 3 4 5 6 7 | 8 9 0 1 2 3 4 5 | 6 7 8 9 0 1 2 3 | 4 5 6 7 8 9 0 1 |
| Type | Length | Value... | |

The sub-attribute may use the attribute defined in RFC 2866 and RFC 3162, without any change of the TLV (Type, Length, and Value) of the attribute. The Value of the sub-attribute must use one of the following attributes to indicate a designated IP address:

Framed-IP-Address: indicating the address to be configured for the host;

Framed-IPv6-Prefix: indicating an IPv6 prefix to be configured for the host;

Login-IPv6-Host: indicating a system with which to connect the host.

The Value of the String may also be extended and used for implementing related authorization according to requirements, for example, ACL, CAR and so on. The attributes which may be used when the related authorization is implemented include:

Acct-Session-Id: session identifier for accounting;

Acct-Input-Octets: indicating how many octets have been received from the port over the course of a service being provided;

Acct-Output-Octets: indicating how many octets have been sent to the port in the course of delivering a service;

Acct-Input-Packets: indicating how many packets have been received from the port over the course of a service being provided;

Acct-Output-Packets: indicating how many packets have been sent to the port in the course of delivering a service.

The method of encapsulating the sub-attribute in the Acct-Address-Flow attribute is the same as that in a Vendor-Specific defined in RFC2865.

With the Acct-Address-Flow attribute in the Account-Request packet, the client (the network access server) of the RADIUS server directly transmits the accounting information such as the flow of each IP address of the host to the RADIUS server after encapsulating the accounting information according to the packet format defined in RFC 2866 and the above-defined type of attributes, thereby making statistics of the accounting information of different IP addresses of the host respectively, such as flow statistics and the like.

Similarly, the Account-Request packet with an extensible field between a network access server and an AAA server may also be the packet including a Vendor-Specific field and transferred between the network access server and the AAA server. The sub-attribute included in the Acct-Address-Flow attribute may also be encapsulated in the Vendor-Specific field defined in RFC2865, thereby avoiding adding the Acct-Address-Flow attribute to the Account-Request packet. But the value of the Type of the sub-attribute needs to be adjusted to avoid confliction.

The foregoing are only preferred embodiments of the present invention and are not for use in limiting the present invention, any modification, equivalent replacement or improvement made under the spirit and principles of the present invention should be included in the protection scope of the present invention.

What is claimed is:

1. A method for authorizing and charging a host with multiple addresses assigned to the host in an IPv6 network comprising an Authentication, Authorization and Accounting (AAA) server and a network access server, comprising:
   determining, by the AAA server, authorized multiple addresses of the host and a respective authorization status for each of the authorized multiple addresses of the host;
   transmitting, to the network access server, a first packet containing authorization information in an extensible field of the first packet, wherein the authorization information comprises the respective authorization status for each of the authorized multiple addresses of the host, and the respective authorization status is unique to each individual address of the authorized multiple addresses of the host;
   receiving, by the AAA server, a second packet containing accounting information in an extensible field of the second packet from the network access server, wherein the accounting information comprises a respective accounting policy that is unique to each of the authorized multiple addresses of the host; and
   charging, by the AAA server, the authorized multiple addresses of the host respectively according to the accounting information corresponding to the authorized multiple addresses of the host, wherein the AAA server charges the authorized multiple addresses differently based on the respective accounting policy that is unique to each of the authorized multiple addresses of the host.

2. The method of claim 1, comprising:
   transmitting, by the network access server, accounting information corresponding to the authorized multiple addresses of the host to the AAA server.

3. The method of claim 1, wherein the accounting information of the authorized multiple addresses comprises at least one of:
   an identifier of a session, transmitted by each address of the authorized multiple addresses; and
   flow, transmitted by each address of the authorized multiple addresses.

4. The method of claim 3, wherein the flow transmitted by each address of the authorized multiple addresses comprises at least one of: input flow and output flow transmitted by each address of the authorized multiple addresses.

5. The method of claim 3, wherein the flow is transmitted by each address of the authorized multiple addresses in octet or in packet.

6. The method of claim 1, wherein the AAA server comprises: a Remote Authorization Dial in User Service (RADIUS) server.

7. The method of claim 6, wherein:
   the RADIUS server transmits the authorization information contained in an Access-Accept packet to the network access server; and
   the network access server transmits the accounting information contained in an Accounting-Request packet to the RADIUS server.

8. The method of claim 7, wherein:
   the RADIUS server transmits the authorization information contained in an extensible field of the Access-Accept packet to the network access server; and
   the network access server transmits the accounting information contained in an extensible field of the Accounting-Request packet to the RADIUS server.

9. The method of claim 8, wherein the extensible field comprises: a Vendor-Specific field defined in RFC2865 protocol.

10. The method of claim 7, wherein the authorization information and accounting information respectively comprises the following attributes: Type, Length, Attr-Count and String.

11. The method of claim 10, wherein the String comprises: Type, Length and Value.

12. The method of claim 11, wherein the Value comprises one of: Framed-IP-Address, Framed-IPv6-Prefix and Login-IPv6-Host.

13. The method of claim 12, wherein the Value of the authorization information further comprises at least one of: Class, State, Session-Timeout, Termination-Action and Framed-Routing.

14. The method of claim 12, wherein the Value of the accounting information further comprises at least one of: Acct-Session-Id, Acct-Input-Octets, Acct-Output-Octets, Acct-Input-Packets and Acct-Output-Packets.

15. A system for authorizing and charging a host with multiple addresses assigned to the host in an IPv6 network, comprising:
   a network access server, configured to transmit accounting information of the multiple addresses of the host upon receiving authorization information, wherein the accounting information for the multiple addresses of the host comprises a respective accounting policy that is unique to each of the multiple addresses of the host and is contained in an extensible field of a second packet; and
   an Authentication, Authorization and Accounting (AAA) server, configured to determine a respective authorization status for each of the multiple addresses of the host, and transmit the authorization information for the multiple addresses to the network access server, wherein the authorization information is contained in an extensible field of a first packet and comprises the respective authorization status for each of the multiple addresses, and the respective authorization status is unique to each individual address of the multiple addresses; the AAA server further configured to receive the accounting information transmitted from the network access server, and charge the multiple addresses according to the accounting information respectively, wherein the AAA server charges the multi addresses differently based on the respective accounting policy that is unique to each of the multiple addresses of the host.

16. An Authentication, Authorization and Accounting (AAA) server, comprising:
   a first unit at the AAA server, configured to determine a respective authorization status for multiple addresses of a host, and transmit, to a network access server, a first packet containing authorization information in an extensible field of the first packet, wherein the authorization information comprises the respective authorization status for each of the multiple addresses of the host, and the respective authorization status is unique to each individual address of the multiple addresses of the host; and a second unit at the AAA server, configured to receive a second packet containing accounting information in an extensible field of the second packet from the network access server, wherein the accounting information comprises a respective accounting policy that is unique to each of the multiple addresses of the host, and charge the multiple addresses according to the accounting information respectively, wherein the second unit at the AAA server charges the multiple addresses differently based on the respective accounting policy that is unique to each of the multiple addresses of the host.

17. The AAA server of claim 16, wherein the first packet is an Access-Accept packet; and wherein the second packet is an Accounting-Request packet.

18. A network access server, comprising:

a first unit at the network access server, configured to receive, from an Authentication Authorization and Accounting (AAA) server, a first packet containing authorization information corresponding to multiple addresses of a host in an extensible field of the first packet, wherein the authorization information comprises a respective authorization status for each of the multiple addresses of the host, and the respective authorization status is unique to each individual address of the multiple addresses of the host; and a second unit at the network access server, configured to transmit accounting information corresponding to multiple addresses of the host upon receiving authorization information from the AAA server, wherein the accounting information comprises a respective accounting policy that is unique to each of the multiple addresses of the host and is contained in an extensible field of a second packet, wherein the respective accounting policy that is unique to each of the multiple addresses of the host enables the AAA server to charge the multiple addresses differently.

19. The network access server of claim 17, wherein the first packet is an Access-Accept packet; and wherein the second packet is an Accounting-Request packet.

* * * * *